(12) United States Patent
Galvano et al.

(10) Patent No.: US 7,199,589 B2
(45) Date of Patent: Apr. 3, 2007

(54) METHOD FOR CONTROLLING A SWITCHING CONVERTER AND CONTROL DEVICE FOR A SWITCHING CONVERTER

(75) Inventors: Maurizio Galvano, Raffadali (IT); Giovanni Capodivacca, Padua (IT); Nicola Florio, Bari (IT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/198,866

(22) Filed: Aug. 4, 2005

(65) Prior Publication Data

US 2006/0055380 A1 Mar. 16, 2006

(30) Foreign Application Priority Data

Aug. 4, 2004 (EP) ................... 04018484

(51) Int. Cl.
*G01R 31/08* (2006.01)
*G01R 31/26* (2006.01)
(52) U.S. Cl. ................. 324/521; 324/769; 324/765
(58) Field of Classification Search ............. 324/415, 324/521
See application file for complete search history.

(56) References Cited

U.S. PATENT DOCUMENTS

| | | | | |
|---|---|---|---|---|
| 5,949,273 A * | 9/1999 | Mourick et al. | ............ | 327/442 |
| 6,038,189 A * | 3/2000 | Morishita | ................ | 365/227 |
| 6,741,116 B2 * | 5/2004 | Herzer et al. | ............... | 327/434 |
| 6,833,722 B2 * | 12/2004 | Cirkel et al. | ................ | 324/765 |
| 6,873,191 B2 * | 3/2005 | Dequina et al. | ............. | 327/110 |
| 6,930,500 B2 * | 8/2005 | Srivastava | ................ | 324/763 |
| 2004/0124818 A1 | 7/2004 | Dequina et al. | ............ | 323/282 |

OTHER PUBLICATIONS

Tietze et al., "Semiconductor Circuitry [Halbleiter-Schaltungstechnick]", 10th Edition, Springer-Verlag Berlin Heidelberg, New York, 1993, pp. 561-569, (9 pages).

* cited by examiner

*Primary Examiner*—Andrew H. Hirshfeld
*Assistant Examiner*—Marina Kramskaya
(74) *Attorney, Agent, or Firm*—Maginot, Moore & Beck

(57) ABSTRACT

A method and a device is provided for controlling a switching converter comprising a high side switch and a low side switch. The method comprises testing the high side switch for a short circuit, and upon detection of a short circuit in the high side switch, leaving the switching converter in an operationally reliable state or shifting the converter to an operationally reliable state.

22 Claims, 3 Drawing Sheets

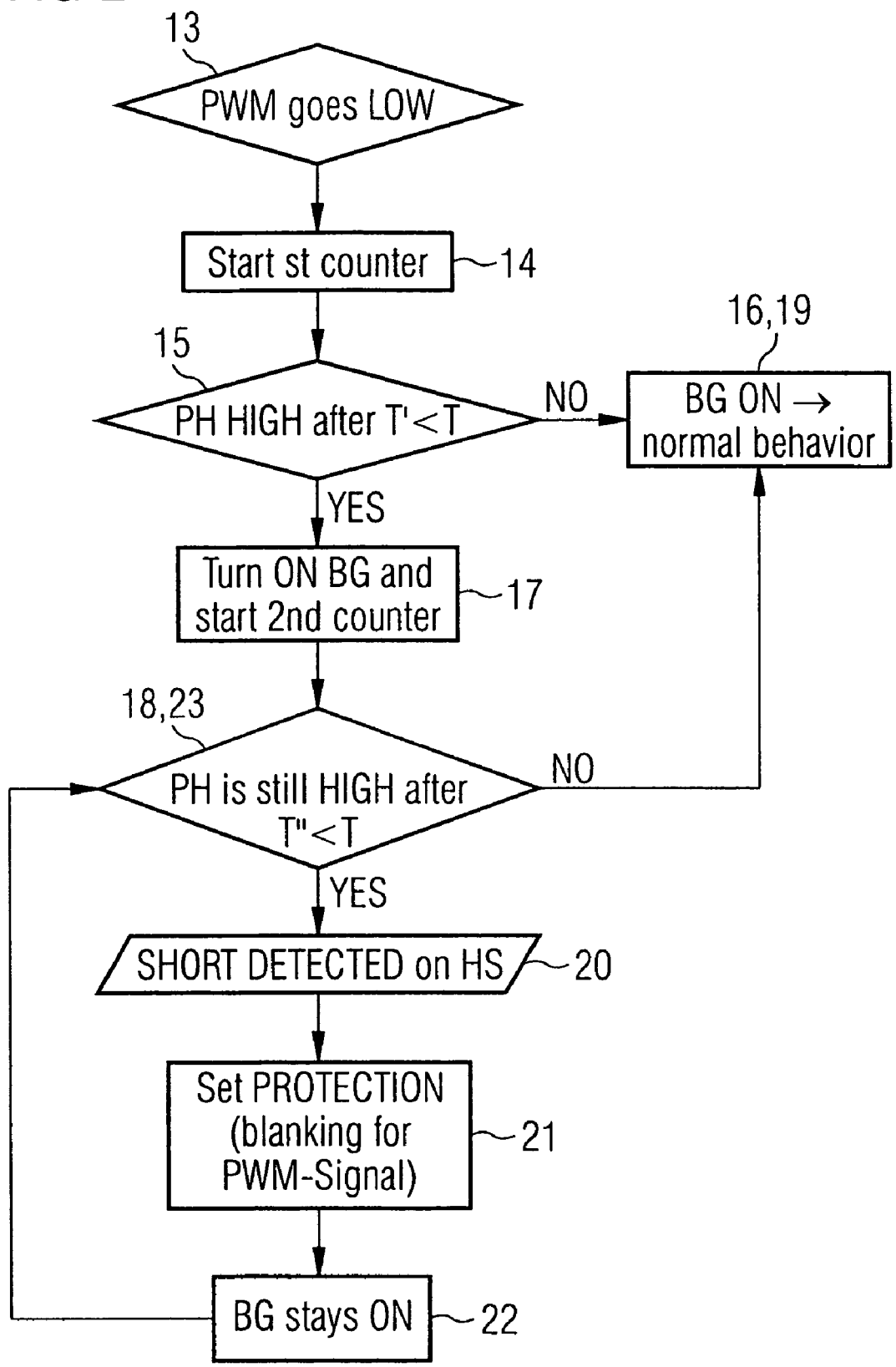

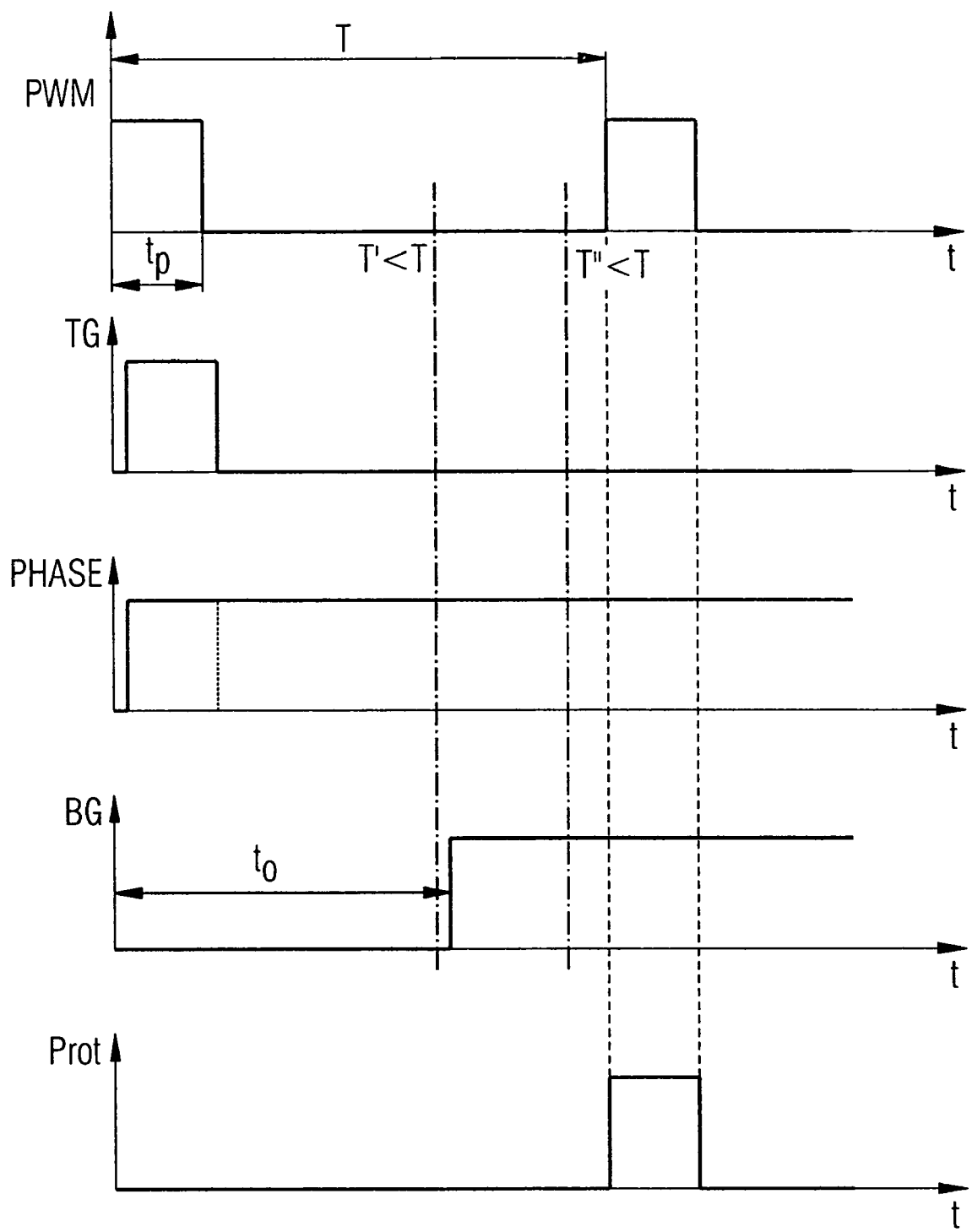

METHOD FOR CONTROLLING A SWITCHING CONVERTER AND CONTROL DEVICE FOR A SWITCHING CONVERTER

BACKGROUND

The invention relates to a method for controlling a switching converter (switching regulator, switched mode power supply) comprising a high side switch and a low side switch, as well as a control device for a switching converter comprising a high side switch and a low side switch.

Switching converters include a high side power switch connected to a connection line at a high supply potential which is switched in a clock period of a signal modulated in a pulse width, and generally include a low side power switch connected to a ground line which is switched in a clock pulse of a second signal (possibly derived from the pulse-width-modulated), are known in the prior art in a multiplicity of variations. For examples, reference is made to U. Tietze, Ch. Schenk, "Semiconductor Circuitry" [Halbleiter-Schaltungstechnik], $10^{th}$ edition, Springer-Verlag Berlin Heidelberg New York, 1993, pp. 561 et seq.

The approach is known whereby an overvoltage protection device is provided which turns off the high side power switch when the output voltage exceeds a predetermined threshold.

Although in principle this measure has proven successful, it has nevertheless been determined that devices connected to Buck converters in particular were destroyed by an overvoltage.

It would therefore be advantageous to provide a method for controlling a switching converter comprising a high side switch and a low side switch, as well as a control device for a switching converter comprising a high side switch and low side switch, wherein the occurrence of improper voltages, specifically overvoltages, on the output side is prevented.

SUMMARY

The invention starts with a switching converter, specifically, a step-up converter or a Buck converter of the species described above which has a high side switch and a low side switch, specifically, a bridge circuit or half-bridge circuit.

The method according to the invention for controlling the switching converter is distinguished by the fact that the high side switch is tested for a short circuit, and that upon detection of a short circuit in the high side switch the switching converter remains in an operationally reliable state (whenever it is already in such a state), or by the fact that the converter is shifted to an operationally reliable state (because and to the extent a danger exists that the high side switch has been destroyed such that the output voltage can no longer be regulated). This measure prevents the loads connected to the output of the converter from being destroyed by an overvoltage.

The device according to the invention for controlling a switching converter accordingly comprises testing means which test the high side switch for a short circuit, and control means which, upon detection of a short circuit in the high side switch, shift the switching converter to an operationally reliable state or which, upon detection of the short circuit ensure in the high side switch that the switching converter remains in an operationally reliable state—thereby effectively preventing destruction of the load device supplied with a clocked DC voltage by the switching converter.

In an especially advantageous variant embodiment of the invention, the high side switch is tested for a short circuit by testing for a missing change in the phase position of the output voltage, which is provided by the switching converter and supplies the load device, relative to the corresponding current drawn by the load device in response to a change in the switching state of the high side switch. If it is determined that the phase position of current relative to voltage has not changed, despite the fact that the high side switch has been turned on or off, then this is an indication that the high side switch is defective and that the switch has continued to remain in its state prior to being actuated. As a rule, the switch will be short circuited, for example, because the transistor acting as the switch has been breached. As a result, the full operating voltage is applied at the output of the bridge or half-bridge if the measures according to the teaching of the invention creating an operationally reliable state have not been taken.

In principle, it is possible to determine the phase position continuously. As a rule, however, this is relatively complicated and also not required for the reliable operation of the switching converter. According to the invention, in an especially advantageous embodiment of the variant described above, a test of the phase position is performed only at a (preferably predetermined) point in time after the switching state of the high side switch has changed. If at this point in time it is determined that the phase position has not changed (or has not changed by some predetermined amount which indicates a short circuit), this is interpreted as a short circuit and appropriate measures are initiated to shift the converter to an operationally reliable state, unless it is already in such a state.

In order to preclude misinterpretations, the invention provides that the time interval be shorter than the time period until another change in the switching state of the high side switch occurs.

Although in principle any change in the switching state of the high side switch may be used to analyze the phase position of the output signal, it has proven to be especially advantageous to test the change in the phase position in response to a turning-off of the high side switch. After the turn-off and when the high side switch is operating properly, energy is only drawn from the converter (by the load device), and no energy is supplied to it, with the result that the phase position will change relatively rapidly, whereas after turning on when the high side switch is operating properly energy is both supplied and removed—with the result that in the initial moment after turn-on the phase position may change only very slightly. In the first case, any changes in the phase position are thus detectable with greater sensitivity, and the identification of a short circuit is less prone to error.

In order to be able to detect a short circuit of the high side switch as such even more reliably, according to the invention the high side switch is alternatively or additionally tested for a short circuit by testing for a missing change in the phase position of the output voltage supplied by the switching converter in response to a change in the switching state of the low side switch. Preferably, the low side switch here is turned on. When the low side switch is turned on, the output terminal of the converter is short circuited to ground. If the high side switch is open, the phase position will change rapidly due to the current draining through the low side switch, whereas no change will occur if the high side switch is open. If the high side switch is open, despite the fact that it is supposed to be closed, this condition can be easily used to detect a short circuit.

Again, in principle, it is possible to determine the phase position continuously. As a rule, however, it is relatively complicated and also not required for the reliable operation of the switching converter. Thus, according to the invention, as in the above case, a missing change in the phase position after a predetermined time interval after a change in the switching state of the low side switch is interpreted as a short circuit of the high side switch.

The point in time for determining the phase position is selected, in a manner analogous to the above, so that the time interval for the change in the switching state is smaller than the time period until another change in the switching state of the high side switch occurs.

Furthermore, according to the invention, the operationally reliable state in which the converter is placed upon detection of a short circuit, or the state in which the converter remains, is the turned-on state of the low side switch. This ensures that the energy drawn by the converter is not delivered to the load device but instead dissipated within the converter itself.

In an especially advantageous embodiment of the invention, the above described process is implemented repeatedly, and the operationally reliable state in which the converter is found upon detection of a short circuit is vacated only once it has been determined that no short circuit is present in the high side switch.

BRIEF DESCRIPTION OF THE DRAWINGS

The following explains the invention in more detail based on the drawings.

FIG. 2 is a flowchart showing the functional principle of the control device of FIG. 1; and FIG. 3 shows the signal characteristics within the control device of FIG. 1 which implements the functional principle presented in the flowchart of FIG. 2.

DESCRIPTION

Figure 1:
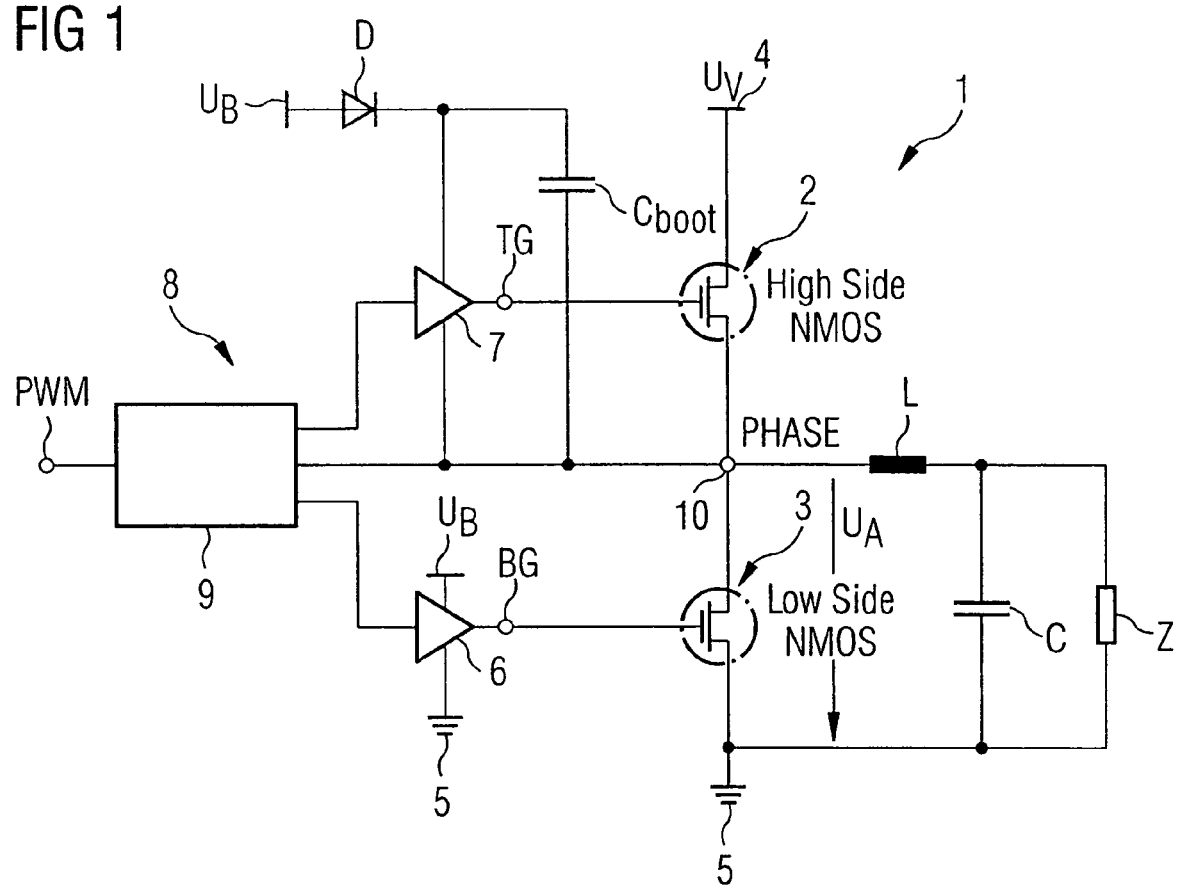
FIG. 1 is a schematic diagram of one embodiment of a control device according to the invention for a Buck converter in a half-bridge configuration.

The Buck converter 1 shown in the circuit of FIG. 1 comprises two power switching transistors, a high side NMOS transistor 2 connected to a supply potential line 4, and a low side NMOS transistor 3 connected to a ground line 5. High side and low side transistors 2, 3 are interconnected at a node which is formed by the output 10. The switching converter 1 is designed as a half-bridge circuit in which, starting from output 10, an inductance L and a capacitance C are connected in series with ground line 5.

The load to be supplied by switching converter 1 with a voltage, which load is symbolized in the schematic diagram as inductance Z, is connected in parallel to capacitance C to ground connection 5 and to inductance L. The two switching transistors 2, 3 are controllable by corresponding gates. In the drawings, the corresponding gate terminals, hereafter called the top gate and bottom gate, are identified by the reference characters TG and BG.

Gates TB, BG are controlled by drivers 6, 7 which are interconnected in the known conventional manner.

Drivers 6, 7, and thus gates TG, BG of switching transistors 2, 3, are controlled by a control device 8, of which only a short circuit detector 9 provided according to the invention is shown in the drawings, the function of this detector being described in detail below.

The functional principle of the circuit shown in FIG. 1 will now be explained based on FIGS. 2 and 3.

As is conventionally the case with Buck converters, high side transistor 2 is controlled by pulse-width modulated signal (PWM signal). This signal is identified by the reference notation PWM in FIGS. 1 through 3. The period of the PWM signal is identified by reference notation T in FIGS. 2 and 3.

The following discussion is based on a pulse with a time period $t_p$ which switches high side NMOS transistor 2 to the conducting state.

At the end of the pulse, that is, in the case of a trailing edge for pulse PWM, high side NMOS transistor 2 is to be shifted from the conducting state to the nonconducting state (first step 13 in FIG. 2). As a result, a first counter is started in control device 8 (second step 14 in FIG. 2).

Subsequently, in a third step 15, the phase position PHASE of the output signal $U_A$ is tested at output 10. If it is determined that phase position PHASE has changed after a certain time period $T'-t_p$ after pulse PWM has been turned off (corresponding to $T'<T$), bottom gate terminal BG is controlled in a fourth step 16, and converter 1 shifts to a normal operational state.

If phase position PHASE of output signal $U_A$ at output 10 has not changed (test in third step 15), then low side transistor 3 is controlled by bottom gate BG and a second counter is started (fourth step 17).

After the second counter has started, a test is performed in a fifth step 18 to see whether phase position PHASE at output 10 has changed. If after a certain time $T''-t_0$ ($T''<T$) it is determined that the phase position has changed, then low side transistor 3 is controlled by bottom gate BG in a sixth step 19, and converter 1 is shifted to a normal operational state.

If instead fifth step 18 determines that phase position PHASE of output signal $U_A$ at output 10 has not changed, this is interpreted by short circuit 9 of control device 8 as a short circuit at high side NMOS transistor 2 (sixth step 20).

As a result, control device 8 initiates a procedure which shifts switching converter 1 to an operationally reliable state. In this embodiment, a protective signal Prot in the form of a switching pulse is generated. This protective signal or safety pulse Prot prevents top gate TG of high side NMOS transistor 2 from being controlled by the following pulse-width-modulated pulse PWM (step 21).

Control device 8 ensures that bottom gate BT of low side NMOS transistor 3 continues to be controlled, thereby short circuiting output 10 to ground 5. This action prevents supply voltage $U_V$ from dropping completely across load Z, thereby destroying it. Instead, the current is diverted through low side transistor 3 to ground 5.

In order to preclude the possibility that the normal operation of switching converter 1 remains in this operational safety state due to a misinterpretation of a short circuit in high side NMOS transistor 2, the invention provides that phase position PHASE be tested once again during the next period T of PWM signal PWM (ninth step 23). As a result, procedural steps 5 through 9 may cycled through multiple times as required, as indicated by reference numerals 18, 19, 21, 22.

The invention claimed is:

1. A method for controlling a switching converter including a high side switch and a low side switch, the method comprising: a) testing the high side switch for a short circuit, and b) upon detection of a short circuit in the high side switch, shifting the switching converter to an operationally reliable state or leaving the switching converter in an operationally reliable state, wherein the step of testing the high side switch for a short circuit comprises performing a test for a missing change in a phase position of an output voltage provided by the switching converter in response to a change in a switching state of the high side switch.

2. The method of claim 1 wherein a short circuit is detected if the phase position has not changed after a predetermined time interval has been exceeded following a change in the switching state of the high side switch.

3. The method of claim 2 wherein the predetermined time interval is smaller than a time period until another change in the switching state of the high side switch occurs.

4. The method of claim 1 wherein the switching state is the turn-off for the high side switch.

5. The method of claim 1 wherein upon detection of a short circuit in the high side switch, the low side switch is turned on or remains in the turned-on state.

6. The method of claim 1 wherein steps a) and b) are implemented repeatedly.

7. A method for controlling a switching converter including a high side switch and a low side switch, the method comprising:
  a) testing the high side switch for a short circuit, and
  b) upon detection of a short circuit in the high side switch, shifting the switching converter to an operationally reliable state or leaving the switching converter in an operationally reliable state, wherein the step of testing of the high side switch for a short circuit comprises performing a test for a missing change in a phase position of the output voltage provided by the switching converter in response to a change in a switching state of the low side switch.

8. The method of claim 7 wherein it is determined that a short circuit exists if the phase position has not changed after a predetermined time interval has been exceeded following a change in the switching state of the low side switch.

9. The method of claim 8 wherein the predetermined time interval is smaller than a time period until an additional change in the switching state of the high side switch occurs.

10. The method of claim 7 wherein the change in the switching state is the turning-on of the low side switch.

11. The method of claim 10 wherein the turning-on of the low side switch occurs after the turning-off of the high side switch.

12. A circuit arrangement comprising: a switching converter comprising a high side switch and a low side switch; and a control device including a testing unit operable to test the high side switch for a short circuit, wherein, upon detection of a short circuit in the high side switch, the control device is operable to shift the switching converter to an operationally reliable state or control the switching converter such that it remains in an operationally reliable state, wherein the testing unit is operable to test the high side switch by testing for a missing change in a phase position of an output voltage provided by the switching converter in response to a change in a switching state of the high side switch.

13. The circuit arrangement of claim 12 wherein the testing unit is operable to determine that a short circuit exists if the phase position has not changed after a predetermined time interval has been exceeded following a change in the switching state of the high side switch.

14. The circuit arrangement of claim 13 wherein the predetermined time interval is smaller than a time period until another change in the switching state of the high side switch occurs.

15. The circuit arrangement of claim 12 wherein the change in the switching state is the turn-off for the high side switch.

16. The circuit arrangement of claim 12 wherein the control device is operable to switch the state of the low side switch in response to the detection of a short circuit or control the low side switch so that it remains in the turned-on state.

17. The circuit arrangement of claim 12 wherein the control device is operable to repeatedly test the high side switch for a short circuit, and, upon detection of a short circuit in the high side switch, shift the switching converter to an operationally reliable state or leave the switching converter in an operationally reliable state.

18. A circuit arrangement comprising:
  a switching converter comprising a high side switch and a low side switch; and
  a control device including a testing unit operable to test the high side switch for a short circuit, wherein, upon detection of a short circuit in the high side switch, the control device is operable to shift the switching converter to an operationally reliable state or control the switching converter such that it remains in a operationally reliable state, wherein the testing unit is operable to test the high side switch for a short circuit by testing for a missing change of a phase position of the output voltage provided by the switching converter in response to a change in a switching state of the low side switch.

19. The circuit arrangement of claim 18 wherein the control device is operable to determine that a short circuit exists if the phase position has not changed after a predetermined time interval has been exceeded following a change in the switching state of the low side switch.

20. The circuit arrangement of claim 19 wherein the predetermined time interval is smaller than a time until an additional change in the switching state of the high side switch occurs.

21. The circuit arrangement of claim 18 wherein the change in the switching state is the turning-on of the low side switch.

22. The circuit arrangement of claim 21 wherein the turning-on of the low side switch occurs after the turning-off of the high side switch.

* * * * *